March 24, 1970 P. C. DIMITRACOPOULOS 3,502,761

METHOD OF FORMING MAGNETIC RECORD DISCS

Filed Sept. 25, 1967 2 Sheets-Sheet 1

March 24, 1970 P. C. DIMITRACOPOULOS 3,502,761

METHOD OF FORMING MAGNETIC RECORD DISCS

Filed Sept. 25, 1967 2 Sheets-Sheet 2

United States Patent Office 3,502,761
Patented Mar. 24, 1970

3,502,761
METHOD OF FORMING MAGNETIC RECORD DISCS

Panayotis C. Dimitracopoulos, P.O. Box 458, Outremont, Montreal 154, Quebec, Canada Filed Sept. 25, 1967, Ser. No. 670,037
Int. Cl. B29d *17/00;* G11b *5/84*
U.S. Cl. 264—153 9 Claims

ABSTRACT OF THE DISCLOSURE

A method for forming pregrooved magnetic record discs, whereby a plastic sheet coated with or containing magnetic oxide is pressed between two enantiomorphic matching dies, these dies having been manufactured by electroplating a specially engraved plastic disc, for example a phonographic lacquer.

Field of invention

This invention relates to the manufacturing of pregrooved magnetic discs of the type employed for the recording and reproduction of audio, impulse information or signals.

Description of prior art

Magnetic tape, as used in "tape recorders," is probably the best known medium for magnetic recording of audio and impulse information. It consists of a plastic or paper ribbon containing magnetic oxide, or more commonly, coated with a layer of magnetic oxide. While the ribbon or "tape" form is the most widely used, other forms, like sheets, belts, discs, cylinders, etc. are well known in the art.

An interesting, but little used, form is the "pregrooved disc," which, as its name implies is a relatively thin (usually 2 to 20 thousands of an inch thick), plastic disc coated with, or containing, magnetic oxide and formed, pressed or embossed with a spiral guiding groove, somewhat similar to that employed in the phonographic records. The disc may be placed on a rotating turntable, while an electromagnetic transducer, secured on an arm, such as a phonographic arm, is guided by the spiral groove, follows the spiral, and thus scans its surface.

In order to ensure proper contact between the surface of the disc and the electromagnetic transducer, it is best if the disc is relatively thin, and thus flexible, but until now, it has been very difficult and expensive to produce such thin, flexible, pregrooved magnetic discs, and therefore, this form of magnetic recording medium is seldom employed.

The prior art of making such discs is briefly the following: A pressing die is produced by engraving a spiral groove on a perfectly flat metallic plate having a very smooth surface. A sheet of magnetic-coated material is placed under the die, and a quantity of plastic material, having a melting point lower than that of the magnetic sheet, preheated to change its consistency, from solid to that of putty, is placed under the magnetic sheet. Thus the magnetic sheet is sandwiched between the metallic die and the putty-like plastic. The whole stack is inserted between the plates of a hydraulic press, and heat and pressure is applied. The putty-like plastic exerts the hydraulic pressure that presses the heat-softened magnetic sheet against the grooved die, thus forming, or rather embossing, the spiral groove on the magnetic sheet. While the pressure is maintained, the heat is cut off, and the die is cooled, for example, by circulating in the press cold water. After the temperature has sufficiently dropped, the pressure is removed, the plates separated and the magnetic sheet with the hydraulic-pressure-producing plastic backing adhering to it, are withdrawn from the press as one unit, both plastics having now cooled and, therefore, solidified. The magnetic sheet may now be separated by lifting it away (or peeling it off) from the plastic backing.

It is evident that this embossing technique is slow, costly and does not lend itself to large scale manufacturing. Several attempts have been made to substitute the hydraulic-pressure-producing plastic with other materials, such as silicon rubber and the like, with unsatisfactory results.

OBJECTS OF THE INVENTION

It is, therefore, the object of this invention to provide a method whereby magnetic pregrooved discs may be mass-produced at a highly accelerated production speed and at a fraction of the cost heretofore possible.

It is a further object of this invention to provide a method capable of producing such magnetic pregrooved discs of the highest quality, all having exactly the same properties, parameters and characteristics.

It is a further object of this invention to produce magnetic discs having better wear characteristics than the magnetic sheet from which they were produced, and also causing less wear to the electromagnetic transducers (magnetic pick up heads), of the reproduction apparatus in which they are used.

Other objects of the invention will become evident from the ensuing description, illustration and claims.

SUMMARY

Pressing, forming or embossing a spiral guiding groove on thin pregrooved magnetic discs between two metallic enantiomorphic matching dies. The dies are formed by first cutting or engraving a spiral groove on a flat and perfectly smooth plastic disc, electroplating this plastic disc, separating it from the plating and re-electroplating the first plating, boring holes in the two platings while they still adhere to one another and then separating them, thus producing two perfectly matched and mating allochral dies, which may now be secured to the pressing surfaces of a press and aligned with perfect concentricity and azimuthal orientation by inserting guiding pins through the bored holes.

BRIEF DESCRIPTION OF THE FIGURES

FIGURE 1 is a top view of one die according to the present invention.

DESCRIPTION OF THE PREFERRED EMBODIMENT

As previously stated, it has been heretofore uneconomical to mass produce pregrooved magnetic discs, and therefore, this medium of magnetic recording and reproduction finds only limited applications, in cases where cost is not an important factor.

The inventor of the instant invention has felt that if a method could be developed for the economical mass-production of such discs, a huge new field of applications would open up. He, therefore, experimented for several years, with a number of methods and processes with only limited success. It finally occurred to him that if a pair of metallic enantiomorphic, matching dies were produced (i.e. perfectly matching in all coordinates, including a perfect concentricity and azimuthal orientation), a thin magnetic sheet (approximately two to twenty-five thousands of an inch thick) could be pressed or embossed between them. But since the size of the grooves was only a few thousands of an inch (i.e. comparable to a phonographic groove), the manufacturing of such a pair of perfectly matching dies was nearly impossible.

For the better understanding of the magnitude of the problem, it would be helpful to briefly describe the shape and groove parameters of such pregrooved magnetic discs.

Figure 1:
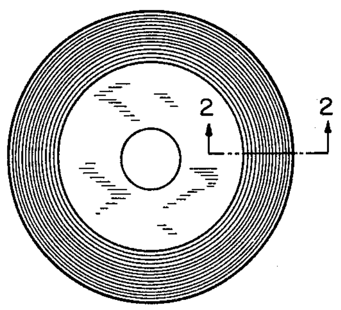
FIGURE 1 illustrates a typical, pregrooved magnetic disc.
Figure 2:
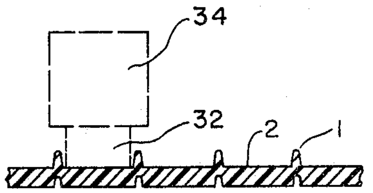
FIGURE 2 is a segment of a greatly enlarged cross-section of the magnetic disc along line 2—2 of FIG. 1.

FIGURE 1 is a plan view of such a magnetic pregrooved disc, while FIGURE 2 is a segment of a greatly enlarged cross-section along line 2—2 of FIGURE 1.

The groove is usually in the form of a spiral, in the usual phonographic fashion, except that the "land" area, or bottom, of such a groove 2 is somewhat wider, in order to accommodate the flat tip or "shoe" 32 of the electromagnetic transducer (electromagnetic head) 34. Separating two adjacent land areas are walls 1, which actually guide the shoe 32 of the magnetic head 34.

Figure 8:
FIGURES 8, 9 and 10 are enlarged cross-sectional segments of magnetic discs, similar to the disc illustrated in FIGURE 2, but having somewhat different groove parameters.
Figure 9:
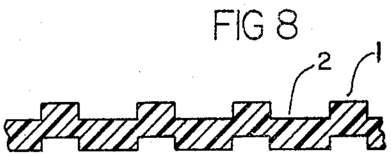
Figure 10:
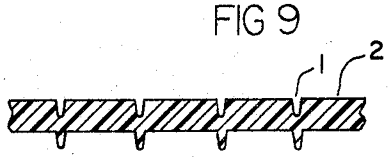

FIGURES 8, 9 and 10 are segments of three alternative forms of cross-sections of such discs. Several other shapes and forms are evidently possible, and FIGURES 2, 8, 9 and 10 are only four examples, for illustrative purposes.

It must be noted and emphasized that the "land" area 2 need only be a few thousands of an inch wide, for example, four to twenty thousands, while the "walls" 1 may really be minuscule in size, perhaps of the order of three to four thousands of an inch.

It is thus evident that the problems of producing two perfectly matching dies and aligning them with perfect concentricity and azimuthal orientation are enormous. It is also evident that the most minute misalignment will not only make impossible the pressing of magnetic discs, but will also permanently damage the dies.

The present invention solves the above problems of pressing the magnetic discs and manufacturing the necessary matching dies.

Figure 4:
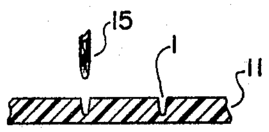
FIGURE 4 illustrates a segment of an enlarged cross-section of the phonographic lacquer (or other equivalent material) and the cutting stylus, employed for cutting a spiral groove on its surface.

A phonographic lacquer disc, or equivalent, is placed on the turntable of a record-cutting lathe or equivalent equipment and a spiral groove of the desired size, pitch and other parameters is cut into it, by means of a cutting stylus, this operation being essentially the "cutting" of a phonographic record, without audio modulation, is well known in the art and, therefore, does not require further description. Thus, FIGURE 4 illustrates a segment of the cross-section of such lacquer disc 11, on the surface of which a "cutting stylus" 15 (of the appropriate and desired size and cross-section) has cut the groove 1.

Figure 5:
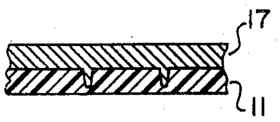
FIGURES 5 and 6 are enlarged cross-sectional segments of the platings employed in the preparation of dies from which the discs of the present invention are pressed.

The lacquer disc 11 is then electroplated in the usual phonographic fashion to produce its exact allochiral (mirror) image, as illustrated by 17 in FIGURE 5.

Figure 6:
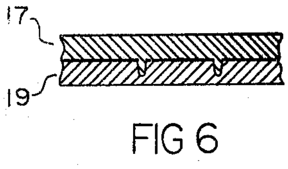

After the plating 17 has been separated from the original lacquer disc 11, it is plated again to produce another allochiral (mirror) image, as illustrated by 19 in FIGURE 6. For reasons that will become evident later; the thickness of both platings 17 and 19 is preferably fairly large.

Figure 3:
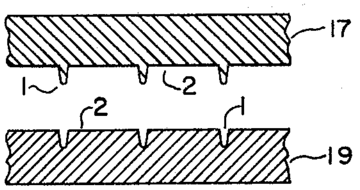
FIGURE 3 illustrates enlarged segments of the cross-sections of the male and female dies between which the discs of the present invention are formed.
Figure 7:
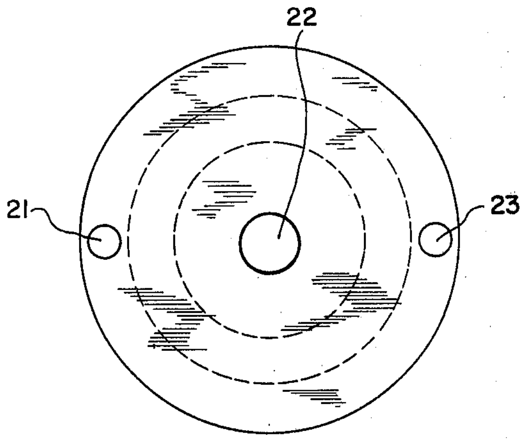

While platings 17 and 19 of FIGURE 6 are still attached to one another, two or more holes are bored with great precision through them, as for example, holes 21, 22, 23 of FIGURE 7. The diameter of these holes is such that hardened, precision ground pins of appropriate diameter may be slipped through them in a close fit. Only after these holes have been bored, platings 17 and 19 are separated from one another and secured on the upper and lower plates of a press, the alignment of the male and female dies 17 and 19, and therefore, of the grooves on them being made possible by first inserting the ground pins through these holes. In this manner, a perfect azimuthal and concentric matching of the dies is possible. Thus, the matching, enantiomorphic pressing dies 17 ("male") and 19 ("female"), face one another, in the press, as diagrammatically illustrated in the enlarged sectional view of FIGURE 3.

Figure 11:
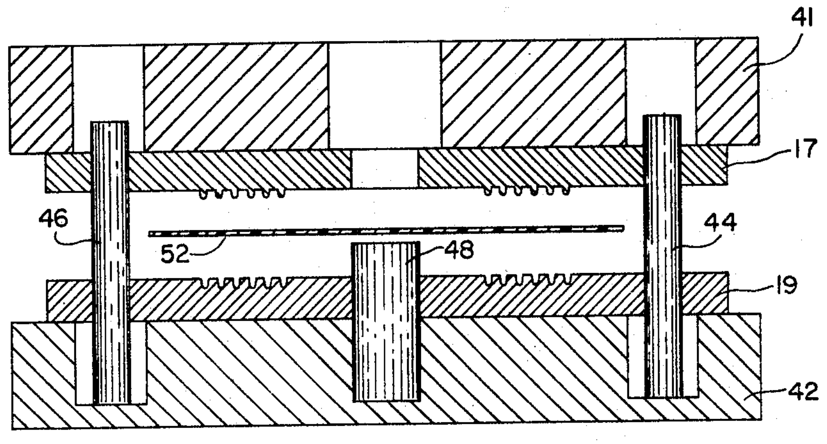
FIGURE 11 is a sectional, somewhat diagrammatic, view of the pressing plates, dies, alignment pins, etc. of the equipment used in pressing the magnetic discs of this invention.

Referring now to FIGURE 11, 17 and 19 illustrate the two matching stamping dies, which have been secured (by means not shown in the drawing) to the pressing plates 41 and 42 of a press (not shown). The above-described hardened ground pins or posts, such as those illustrated by numerals 44 and 46, passing through the precision-bored holes 21 and 23 (FIGURE 7) of the dies 17 and 19, perfectly align these dies to one another.

The pressing dies are heated at the appropriate temperature, a thin, plastic magnetic sheet 52 is inserted between them, and the combination of heat and pressure forms or embosses the guiding groove on the magnetic disc.

If an automatic cycling press is utilized, having an automatic advance mechanism pulling a roll of magnetic sheet through the heated plates, it is possible to greatly accelerate and automate the pressing of the magnetic discs. In this case, holes such as 21 and 23 and corresponding guiding posts 44 and 46 must be oriented in such a way that they will not obstruct the passage of the roll of magnetic sheet through the pressing dies, while pin 48, corresponding to an appropriate hole 22 in the dies (see FIGURE 7) forms a piercing die which perforates the usual central alignment hole on the record.

Figure 12:
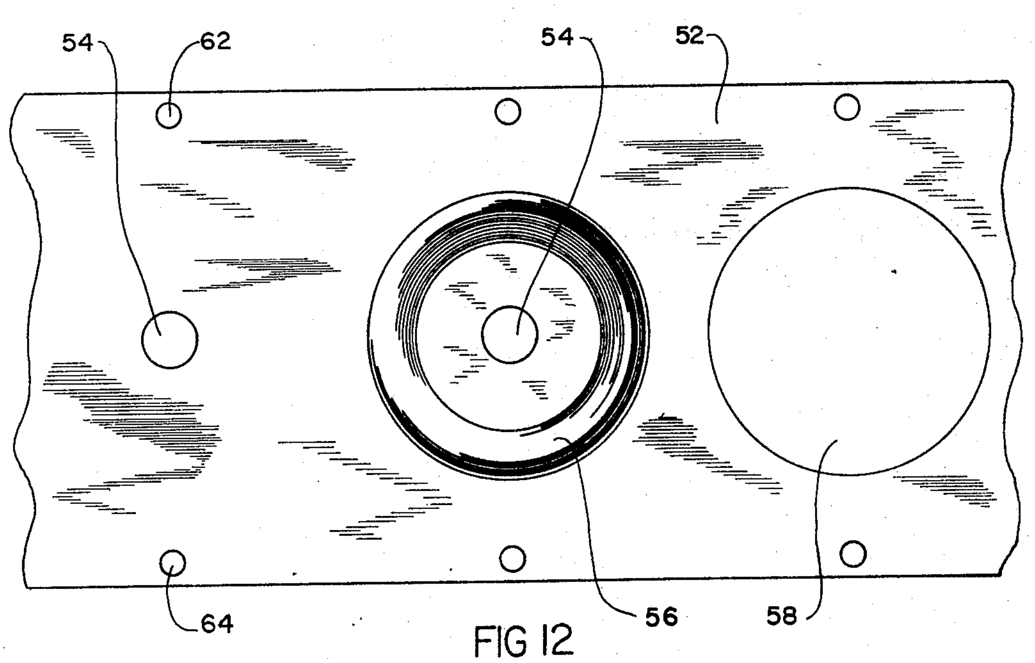
FIGURE 12 illustrates a segment of the roll of magnetic sheet, with three typical, successive steps (piercing, stamping and blanking), which may be employed for the automated production of magnetic discs of the present invention.

Alternatively, if an automatic press is utilized, it is possible to arrange a progressive die system, whereby in the first cycle hole 54 (see FIGURE 12) is pierced, which is employed to locate and align the magnetic sheet 52 around pin 48 (see FIGURE 11) during the second cycle which presses or embosses the spiral groove, and finally, during the third cycle, a blanking die, having a locating pin passing through the locating hole 54, and thus aligning the magnetic sheet 52, blanks out the finished discs of FIGURE 1. Thus, on the magnetic sheet 52 the large opening 58 remains, corresponding to the outer diameter of the blanked out magnetic disc. It is evident that such an arrangement may produce magnetic discs in a continuous, fast and, therefore, highly economical rate. During such fast, automatic operation, it is not required to cool the pressing dies 17 and 19 between stampings, but as the pressing plates are separated, it is helpful to inject a blast of cold air to cool the magnetic sheet 52, before the blanking operation.

Depending on the final configuration of the magnetic disc and the pressing equipment, it is sometimes helpful if locating hole 54 is smaller than the final central hole of the finished disc. In this case, this smaller hole is used as an alignment hole, and during the blanking operation, both the inside hole and the outside diameter of the record are blanked simultaneously.

Finally, in some cases, the locating hole 54 may be replaced by one or more holes pierced in other places of the magnetic roll 52, such as holes 62 and 64 located near the edges of the magnetic roll.

The usual commercial practice is to employ "die-sets" between the pressing plates of a press. Die-sets offer many advantages and are so widely used that they need no further description. The principle of the instant invention may be very advantageously used in connection with die-sets, as it will be now described: The preparation of the two allochiral metallic platings 17 and 19 (as illustrated in FIG. 6), follows the same steps as previously described, except that in this case, their thickness need not be substantial, as a matter of fact, they may be quite thin.

While these platings 17 and 19 are still attached to one another, they are inserted between the plates of a die-set, which are lowered and firmly clamped together in order to sandwich and firmly contain the platings 17 and 19.

Alignment holes, equivalent to previously described holes 21 and 23 (and if necessary 22), are then bored through the whole stack, i.e. through the two plates of the die-set and the unseparated platings 17 and 19. The plates of the die-set are now unclamped, opened and removed from their guiding posts (usually called pins), and the platings 17 and 19 are then separated from one another. Using precision ground pins, closely fitting inside the bored aligning holes abovedescribed, plating 17 is aligned on one plate of the die-set and firmly secured to it, for example by screw means. Plating 19 is similarly aligned and secured to the other plate of the die-set. The die-set is then reassembled by inserting its guiding posts (pins), the two platings 17 and 19 being now in alignment as to coordinates, concentricity and azimuthal orientation, and pressing of the magnetic records may proceed as previously described.

The inventor of the instant invention has experimented with the above-described methods and has produced excellent magnetic pregrooved records. In so doing, he has obtained an additional feature of the greatest possible practical significance: Due to the heat and pressure applied, the magnetic oxide on the surface of the record has been slightly pressed into the plastic base, thus obtaining a highly polished surface on the record. It is well known that the magnetic oxide has abrasive properties which wear the tip, or shoe, of the electro-magnetic transducer (magnetic head), which in turn, gets "loaded" with magnetic oxide and thus wears the magnetic tape. But the high polish obtained on the surface of the magnetic discs of the present invention, reduces to an enormous extent both the transducer wear and the disc wear, thus multiplying by a significant factor the useful life of the transducer and magnetic heads.

It is evident that while throughout the description reference was made to "discs," and "spiral grooves," other forms of records (for example, strips, belts, etc.) and other than spiral, (for example, linear, concentric circles, etc.) grooves may be formed on magnetic-oxide-coated materials within the spirit of the present invention.

What is claimed is:

1. The method of making thin, pregrooved magnetic records comprising the steps of forming a pair of enantiomorphic matching metallic dies by (a) engraving a spiral groove on the surface of a flat disc, (b) electroplating said disc and separating a plated replica therefrom, (c) electroplating said replica to provide a second and mating replica, and (d) separating said two replicas from one another to obtain the two substantially perfectly mating allochiral dies which are complementary at least as to position, concentricity and azimuthal orientation, the spiral of one die constituting a raised spiral partition whose convolutions are spaced to define a spiral track while the spiral of the other die constitutes a spiral groove allochirally mating with said spiral partition;

securing the dies on the upper and lower plates of a press, respectively, to perform a pressing step; and pressing a thin, flexible magnetic sheet between said dies to produce a pregrooved magnetic record having on one side a raised spiral wall whose convolutions are spaced to define a magnetic track along which the shoe of a transducer can ride while it is guided between adjacent convolutions of said wall, said record having on the other side a depressed groove directly beneath said spiral wall.

2. The method of claim 1, in which said flat disc is a virgin phonographic lacquer disc.

3. The method of claim 1, in which the engraving is performed on a phonographic record-cutting lathe.

4. The method of claim 1, in which the combination of replicas provided in step (c) are provided with registration apertures prior to their separation in step (d).

5. The method of claim 4, in which said two replicas after their separation according to step (d) are again aligned as to concentricity and azimuthal orientation, in order to perform the pressing step, by inserting through said registration apertures precision-ground guiding posts.

6. The method of claim 4, in which a central hole is pierced in said magnetic record simultaneously with said pressing step.

7. The method of claim 4, in which said magnetic sheet is fed between said dies as a continuous ribbon of material having indexing formations to cooperate with said press plates in locating and aligning said ribbon relative thereto.

8. The method of clam 7, in which some of said formations are perforations lying at the centers of the finished record spirals.

9. The method of claim 7, including the step of blanking out the final contour of the record subsequent to the pressing operation.

References Cited

UNITED STATES PATENTS

| | | | |
|---|---|---|---|
| 1,442,856 | 1/1923 | Christensen | 18—5.3 |
| 1,495,032 | 2/1923 | Page | 18—5.3 |
| 2,530,842 | 11/1950 | Ruggieri | 204—5 |
| 2,544,010 | 3/1951 | Di Giannantonio | 274—42 |
| 3,113,905 | 12/1963 | Rosen | 18—5.3 X |

FOREIGN PATENTS

| | | | |
|---|---|---|---|
| 591,310 | 1960 | Canada. | |

ROBERT F. WHITE, Primary Examiner

K. J. HOVET, Assistant Examiner

U.S. Cl. X.R.

204—5, 264—163, 220, 293; 274—41.4